(12) United States Patent
Lee et al.

(10) Patent No.: US 7,403,968 B2
(45) Date of Patent: *Jul. 22, 2008

(54) METHOD OF GENERATING USER PROFILE BASED ON USER PREFERENCE AND MULTIMEDIA DATA BROWSING SYSTEM USING THE SAME

(75) Inventors: Jin Soo Lee, Seoul (KR); Kyoung Ro Yoon, Seoul (KR)

(73) Assignee: LG Electronics, Inc., Seoul (KR)

( * ) Notice: Subject to any disclaimer, the term of this patent is extended or adjusted under 35 U.S.C. 154(b) by 418 days.

This patent is subject to a terminal disclaimer.

(21) Appl. No.: 11/057,764

(22) Filed: Feb. 15, 2005

(65) Prior Publication Data

US 2005/0165811 A1 Jul. 28, 2005

Related U.S. Application Data

(63) Continuation of application No. 09/667,072, filed on Sep. 21, 2000.

(30) Foreign Application Priority Data

Sep. 22, 1999 (KR) ................................ 1999/41137

(51) Int. Cl.
  *G06F 15/16* (2006.01)
(52) U.S. Cl. ........................ 709/203; 709/223; 709/231; 725/46; 725/47
(58) Field of Classification Search ................. 709/203, 709/217–219, 223–224, 231; 707/3, 5–7, 707/104.1; 725/46–47
See application file for complete search history.

(56) References Cited

U.S. PATENT DOCUMENTS 5,758,257 A 5/1998 Herz et al.
5,920,856 A * 7/1999 Syeda-Mahmood ............ 707/3
5,945,988 A 8/1999 Williams et al.
5,991,735 A * 11/1999 Gerace ........................ 705/10
6,005,565 A 12/1999 Legall et al. ................. 345/721

(Continued)

FOREIGN PATENT DOCUMENTS

CN 1171582 A 1/1998

(Continued)

OTHER PUBLICATIONS

Japanese Office Action dated Jul. 18, 2006 for Japanese Patent Application No. 2004-321938, 3 pages.

(Continued)

*Primary Examiner*—Phillip B Tran
(74) *Attorney, Agent, or Firm*—Sidley Austin LLP

(57) ABSTRACT

The present invention relates to a method for generating a user profile in indexing/browsing of multimedia data and a multimedia browsing method using the same. The multimedia data browsing method is characterized in that: (a) constructing a user profile by incorporating a user-preferred application description scheme indicating a user-preferred multimedia browsing method or browsing criterion, wherein the browsing method or browsing criterion is described in different way according to a type of the multimedia data in terms of genre; (b) analyzing the user-preferred application description scheme and selecting a relevant application for implementing a user-preferred browsing; and (c) browsing corresponding multimedia data using the selected preferred application.

35 Claims, 8 Drawing Sheets

U.S. PATENT DOCUMENTS

| | | | |
|---|---|---|---|
| 6,029,045 A * | 2/2000 | Picco et al. | 725/34 |
| 6,029,195 A | 2/2000 | Herz | 707/10 |
| 6,144,375 A | 11/2000 | Jain et al. | |
| 6,236,395 B1 * | 5/2001 | Sezan et al. | 715/723 |
| 6,345,274 B1 | 2/2002 | Zhu et al. | 707/5 |
| 6,411,724 B1 | 6/2002 | Vaithilingam et al. | 707/104.1 |
| 6,460,036 B1 | 10/2002 | Herz | 707/10 |
| 6,530,083 B1 | 3/2003 | Liebenow | |
| 6,546,135 B1 | 4/2003 | Lin et al. | 707/104.1 |
| 6,593,936 B1 | 7/2003 | Huang et al. | 345/619 |
| 6,594,699 B1 * | 7/2003 | Sahai et al. | 709/228 |
| 6,684,399 B1 * | 1/2004 | Grooters | 725/48 |
| 6,836,799 B1 * | 12/2004 | Philyaw et al. | 709/224 |

FOREIGN PATENT DOCUMENTS

| | | |
|---|---|---|
| JP | 10-207901 | 8/1998 |
| JP | 10254912 | 9/1998 |
| JP | 11134345 | 5/1999 |
| WO | WO 99/39281 | 8/1999 |
| WO | WO 99/45709 | 9/1999 |

OTHER PUBLICATIONS

Y. Yagawa et al., "TV Program Planning Agent Using Analysis Method of User's Taste," Technical Report of IEICE A198-55, vol. 98 No. 437, Dec. 1, 1998, pp. 9-17.

Japanese Office Action dated Jan. 4, 2006 for Japanese Patent Application No. 2000-289131, 2 pages.

Takako Hashimoto et al., "Prototype of Digest Making and Viewing System for Television," vol. 99 No. 61, Jul. 23, 1999, pp. 133-138, Journal of Information Processing Society, Japan.

Canadian Office Action for Canadian Application No. 2,320,510 (4 pages).

Tomonari Kamba "Personalized Online Newspaper" NEC vol. 49, No. 7, 1996, pp. 11-16 (Non-English).

Comas et al. "Custom TV system and demonstration" Jun. 7, 1999, pp. 1110-1113 IEEE Comput. Soc., Los Alamitos, CA.

Christel et al. "Techniques for the Creation and Exploration of Digital Video Libraries" 1996, pp. 1-33, Multimedia Tools and Applications, Boston US.

Hu et al. "MD2 L: Content Description of Multimedia Documents for Efficient Process and Search/Retrieval" IEEE, May 19-21, 1999.

* cited by examiner

FIG. 5

```
        Functionality
501 ──  <Basic Key Item>
503 ──      <Key-Item 1>="Character"</Key-Item 1>
504 ──      <Key-Item 2>="Relation between Key-Item 1"</Key-Item 1>
        </Basic Key Itrm>
502 ──  <Order of Key Item>
                <Key-Item 1>="priority" </Key-Item 1>
                <Key-Item 2>="priority" </Key-Item 1>
        </Order of Key Item>
```

FIG. 7

```
Functionality
<Basic Key Item>
    <Key-Item 1>="key-frame"</key-Item 1>
</Basic Key Itrm>
<Order of Key Item>
    <Key-Item 1>="time" </Key-Item 1>
</Order of Key Item>
<Depth of key Item>
    <level 1>="3" </level 1>
</Depth of key Item>
```

701

METHOD OF GENERATING USER PROFILE BASED ON USER PREFERENCE AND MULTIMEDIA DATA BROWSING SYSTEM USING THE SAME

This application is a continuation of U.S. patent application Ser. No. 09/667,072, filed Sep. 21, 2000 entitled USER PROFILE INFORMATION DATA STRUCTURE BASED ON USER PREFERENCE AND MULTIMEDIA DATA BROWSING SYSTEM USING THE SAME, and claims priority to Korean Patent Application No. 41137/1999 filed Sep. 22, 1999. The entire disclosure of the prior applications are considered as being part of the disclosure of the accompanying application and are hereby incorporated by reference therein.

BACKGROUND OF THE INVENTION

1. Field of the Invention

The present invention relates, to a method of generating a user profile for browsing of multimedia data and a multimedia browsing method using the same, and more particularly, to a content-based multimedia data indexing and browsing system in which a user-preferred browsing method is described in the user profile, and multimedia browsing based on user preference is provided using user-preferred browsing information contained in the user profile.

2. Description of the Background Art

In multimedia data indexing and browsing in the conventional art, there have been introduced techniques for variously displaying multimedia data based on user preference.

In internet shopping by using of a multimedia data indexing and browsing system based on user preference, there is a method of selecting only preferred items stored in an user profile by each user and displaying each product in a different way, not displaying all information items used in the internet shopping.

For example, in the case that some user mainly uses price and specification information, some user mainly uses design information, and some user mainly uses product information of a certain particular company in checking electronic products through the internet shopping, each user is given the above preferred information as its own user profile. In case that an user mainly uses price and specification in this preferred information, merely the information containing only price and specification is displayed to the user although other information such as photographs is provided by the user. And, in case of an user who prefers design information, design (photograph) information is mainly displayed. In this way, the information appropriate for the preference of each user is displayed.

In addition, there have been introduced techniques for providing a terminal desk-top interface such as a computer to an user in an user-desired form in a multimedia indexing and browsing system based on user preference in the conventional art.

In other words, the terminal desktop interface that the corresponding user prefers (or designates) is recorded in its user profile, and then the form of the interface stored in the corresponding user profile is provided to the user.

Besides, there have been techniques for supporting help information in the form that user prefers using the recorded usage pattern of user in another conventional art.

The above-mentioned techniques considering user preference (use pattern) in the conventional art all reflects partial user preference in the current restricted application.

Nowadays, the content description is described in the data for supporting the content-based multimedia indexing/browsing. In the case the various browsing method are possible, so if there is the information describing user preference, user can browse multimedia data in the preferred browsing method using preferred browser.

In other words, among a variety of browsers for performing content-based multimedia data indexing and browsing, there may be browsers that is particularly preferred, or browsers that is preferred by the type of multimedia data to the user. However, since the maintenance and management of such data is not achieved, the user cannot enjoy his or her right to various selection, but also must be satisfied with parts of the browsers restrictively provided in a given environment.

SUMMARY OF THE INVENTION

Accordingly, it is an object of the present invention to provide a method for generating a user profile to provide a user-preferred multimedia data indexing and browsing, and a multimedia data browsing method using the same.

It is another object of the present invention to provide a multimedia browsing method using a user profile in which a user-preferred browsing method is described therein, for displaying the multimedia data in a user-preferred form.

It is another object of the present invention to provide a multimedia browsing method using a user profile in which a user-preferred browsing method is identified from a user profile, and an application or browser is designated according to user preference if there are plurality of applications providing the corresponding browsing method, or an application satisfying the corresponding service is downloaded from other designated place and is provided to the user if there is not such an application.

To achieve the above objects, in a content-based multimedia data browsing, there is provided a method for generating a user profile to provide a user-preferred multimedia browsing, which incorporate information on a user-preferred application description scheme including information on a browser in the user profile, wherein the information on a browser includes a user-preferred browsing method or a user-preferred browsing criterion, which is described in different way according to a type of multimedia data in terms of a genre.

In addition, the user-preferred application description scheme incorporated in the user profile includes an application ID, or a locator to find a relevant application and a reference to functionality indicating a user-preferred browsing method or browsing criterion.

In addition, the application description scheme incorporated in the above user profile further includes a layout description scheme of an application, wherein the layout includes a weight for the layout and a reference to a browser for indicating reference to the browser.

In addition, the number of user-preferred application description schemes incorporated in the user profile may be plural, and each of the application description schemes further includes a weight for describing user preference of the application.

In addition, the user-preferred application description schemes incorporated in the user profile are different from one another according to a type or a genre of a multimedia data, each of the application description schemes is structured hierarchically, and each part of the application description scheme has a weight for describing user preference.

To achieve the above objects of the present invention, in a content-based multimedia data browsing, there is provided a method for browsing multimedia data containing a content description scheme to be used for indexing/browsing multimedia data; comprising: (a) constructing a user profile by incorporating a user preferred application description scheme indicating a user-preferred multimedia browsing method or browsing criterion as an application description scheme for user-preferred browsing; (b) analyzing the user-preferred application description scheme and selecting a relevant application for implementing a user-preferred browsing, and (c) browsing the multimedia data using the selected user-preferred application. In addition, in the multimedia data browsing method of the present invention, the user-preferred multimedia data browsing method or browsing criterion are described differently according to the type or genre of multimedia data, and a multimedia data is browsed based on the description scheme indicating each user-preferred browsing method or browsing criterion.

In addition, in the multimedia data browsing method of the present invention, the user-preferred multimedia browsing method or browsing criterion is a character-oriented browsing, a character/place relation-oriented browsing, a scene-oriented browsing according to a time sequence, or a combination thereof.

In addition, in the multimedia data browsing method of the present invention, the number of browsing method or browsing criterion described differently according to the type of multimedia data may be one or plural with respect to one type or genre thereof, and weighted values can be added on these browsing methods or browsing criteria.

In addition, in the multimedia data browsing method of the present invention, if there is no application satisfying the user-preferred multimedia browsing method or browsing criterion in the current terminal, in displaying the corresponding multimedia data, such an application is downloaded or plugged-in for thereby implementing the same.

In addition, in the multimedia data browsing method of the present invention, if there are a plurality of applications satisfying the user-preferred multimedia browsing method or browsing criterion in the current terminal, in displaying the corresponding multimedia object based on the user-preferred multimedia browsing method or browsing criterion, a locator of an application or browser is included so as to select an appropriate application among the plurality of applications, and the multimedia object is displayed by selecting the application indicated by the locator of the application or browser.

In order to achieve at least the above objects and advantages in a whole or in part, in accordance with one aspect of the present invention there is provided a method of generating a user profile to describe user preferences pertaining to navigation of and access to multimedia contents that includes providing user preference information for the user profile and incorporating a browsing information in the user preference information, wherein the browsing information, which may be differently described according to a genre of multimedia contents, includes a plurality of browsing criterion and a preference value indicating relative priority or weight assigned to each of said browsing criterion.

Additional advantages, objects and features of the invention will become more apparent from the following descriptions.

BRIEF DESCRIPTION OF THE DRAWINGS

The present invention will become better understood with reference to the accompanying drawings, which are given only by way of illustration and thus are not limitative of the present invention, wherein:

FIG. 5 is a view illustrating a user-preferred application description scheme in a user profile information data structure according to the present invention;

FIG. 7 is a view illustrating another example of a user-preferred application description scheme in a user profile information data structure according to the present invention.

DETAILED DESCRIPTION OF THE PREFERRED EMBODIMENTS

The preferred embodiments of the present invention will now be described in detail with reference to the accompanying drawings.

Figure 1:
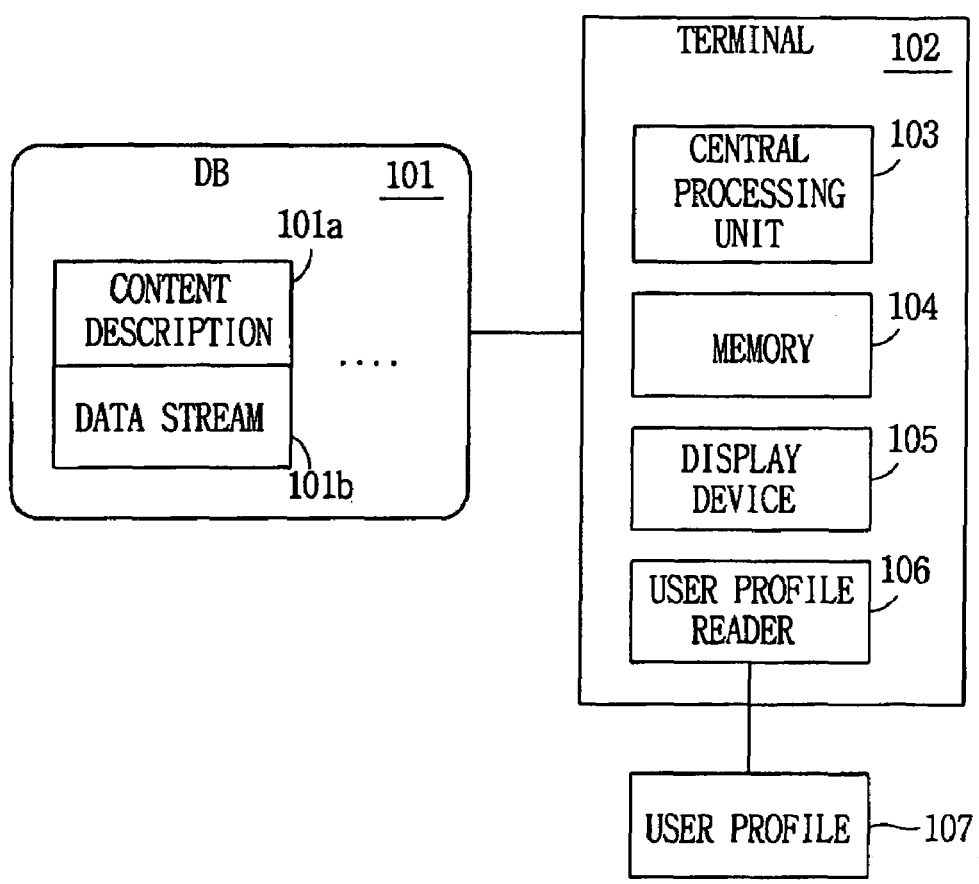
FIG. 1 is a schematic view illustrating the construction of a multimedia system according to the present invention.

First, FIG. 1 is a schematic view illustrating an example of the construction of a multimedia data service system according to the present invention;

A multimedia object 101 has a content description 101a for content-based indexing/browsing and a data stream 101b.

A terminal 102 includes a central processing unit 103 for performing a content-based multimedia indexing and browsing control, a memory 104 for storing a variety of data, a display device 105 for displaying various information relating to multimedia data indexing and browsing, an user profile reader 106 for reading user profile information, and an user profile.

Here, the user profile reader 106 can have the function of a writer for updating information recorded in the user profile 107 based on the feedback of a user.

In addition, the user profile 107 can be a movable medium capable of recording and storing information in the form of a smart card.

In addition, a user-preferred browsing method or browsing criterion is described in the user profile 107, and such information can be updated by learning.

The information contained in the user profile 107 is read out from the user profile reader 106, and is downloaded to the memory 104.

The central processing unit 103 decodes the user profile information downloaded to the memory 104 to thus browse the multimedia object 101 using the corresponding display device 105 by the user-preferred browsing method or browsing criterion.

Figure 2:
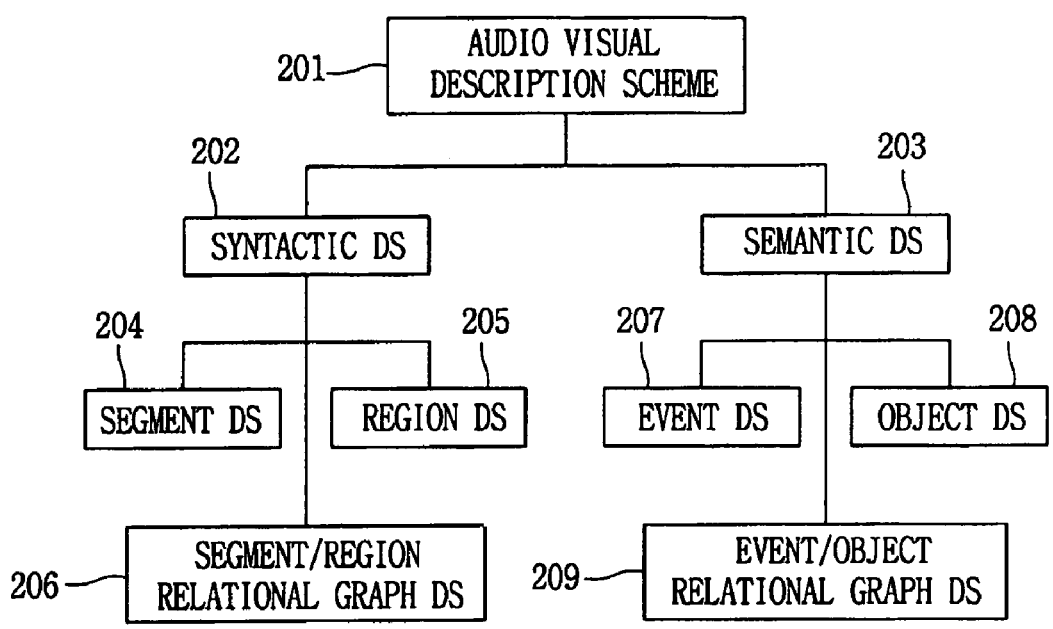
FIG. 2 is a view illustrating an example of a content description scheme structure of a multimedia object according to the present invention.

FIG. 2 is a view illustrating an example of a contents description scheme structure of a multimedia object for content-based indexing/browsing according to the present invention.

The contents description scheme structure has an audio/visual description scheme 201 including a syntactic DS 202 and a semantic DS 203. The syntactic DS 202 includes a segment DS 204, region DS 205, and segment/region relational graph DS 206. The semantic DS 203 includes an event DS 207, object DS 208, and event/object relational graph DS 209.

The syntactic DS 202 describes a physical structure of actual multimedia data, and has segments and regions of the actual multimedia data and information on the relation link) between them, thus making it possible to index and browse a corresponding section or scene of the multimedia data.

The semantic DS 203 describes a semantic structure of multimedia data. In case of a multimedia data, for example, moving pictures such as drama, events, objects (characters, places, etc,), and the relation between events and characters or places are described, thus enabling content-based indexing and browsing of multimedia data.

The description scheme structure of the multimedia data for content-based multimedia data indexing and browsing is not limited to that as shown in FIG. 2, and can be varied in various forms for the purpose of more effective browsing.

Figure 3:
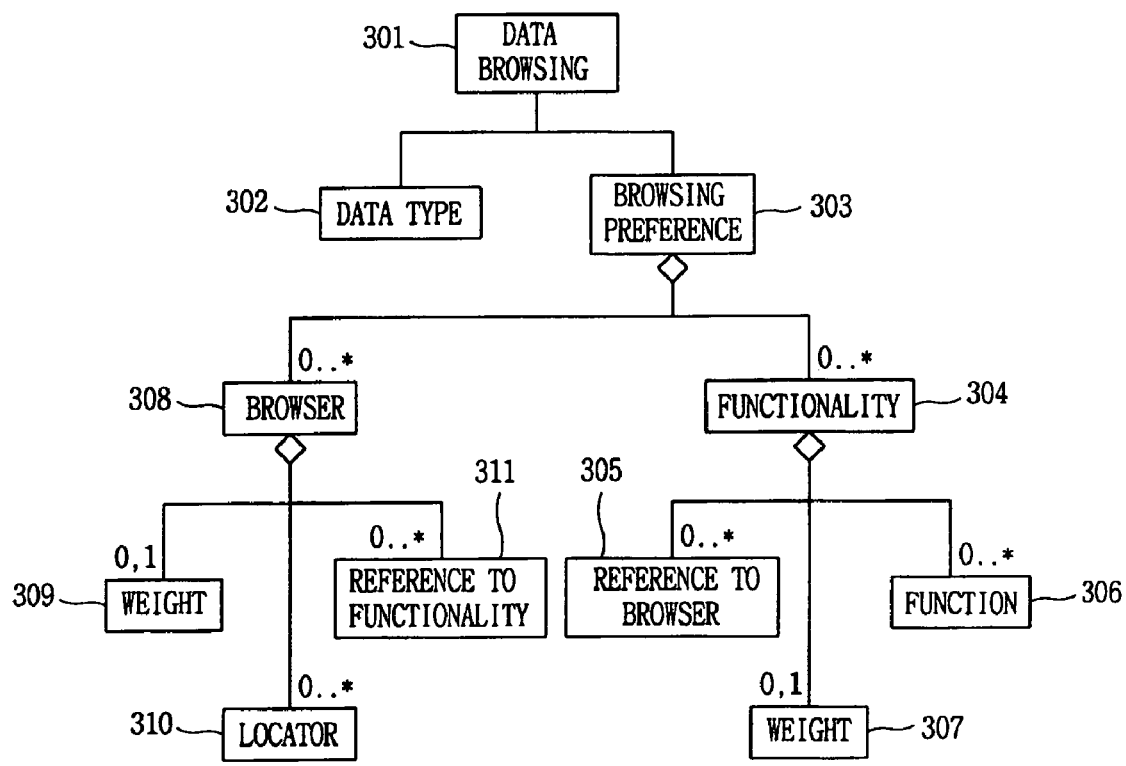
FIG. 3 is a view illustrating a user profile information data structure according to a first embodiment of the present invention.

FIG. 3 is a view illustrating a user profile information data structure for content-based multimedia data browsing according to a first embodiment of the present invention;

The user profile information data structure has a data browsing DS 301 including data type DS 302 and a browsing preference DS 303. Such a data browsing DS structure can be given by the type or genre of each multimedia object.

The browsing preference DS 303 corresponds to the data type DS 302.

The browsing preference DS 303 includes a browser DS 308 as an application DS satisfying user preference and a functionality DS 304 for describing a browsing method or browsing criterion.

The functionality DS 304 for describing a browsing method or browsing criterion has a reference to browser DS 305 for connecting a corresponding browser, a function DS 306 for selecting a browser, and a weight DS 307 for describing a corresponding weight value.

The application DS 308 has a weight DS 309, locator DS 310, and reference to functionality DS 311 for reference to a description scheme for describing a browsing method or standard.

Therefore, by means of the user profile relating to such a user-preferred browsing method (or browsing criterion), it is possible to display a certain particular multimedia data by the user-preferred browsing method or standard in a system of FIGS. 1 and 2.

In other words, when an user displays a multimedia data based on the user profile information, a corresponding application (browser) satisfying description schemes 304 through 307 for describing the user-preferred browsing method or standard for the corresponding data, or having been described in the application description schemes 308 through 311 is indexed in the terminal.

If the corresponding application exists in the terminal, multimedia data is displayed using the same, or if it does not exist in the terminal, the corresponding application is downloaded using the locator DS 310.

In addition, the number of application (browser) included in the application DS is one or more than one. If the number of application is plural, an user-preferred application is employed using the weight DS 309 which is learned based on user preference (user feedback/user's usage pattern of a certain particular browser) for each application.

Figure 4:
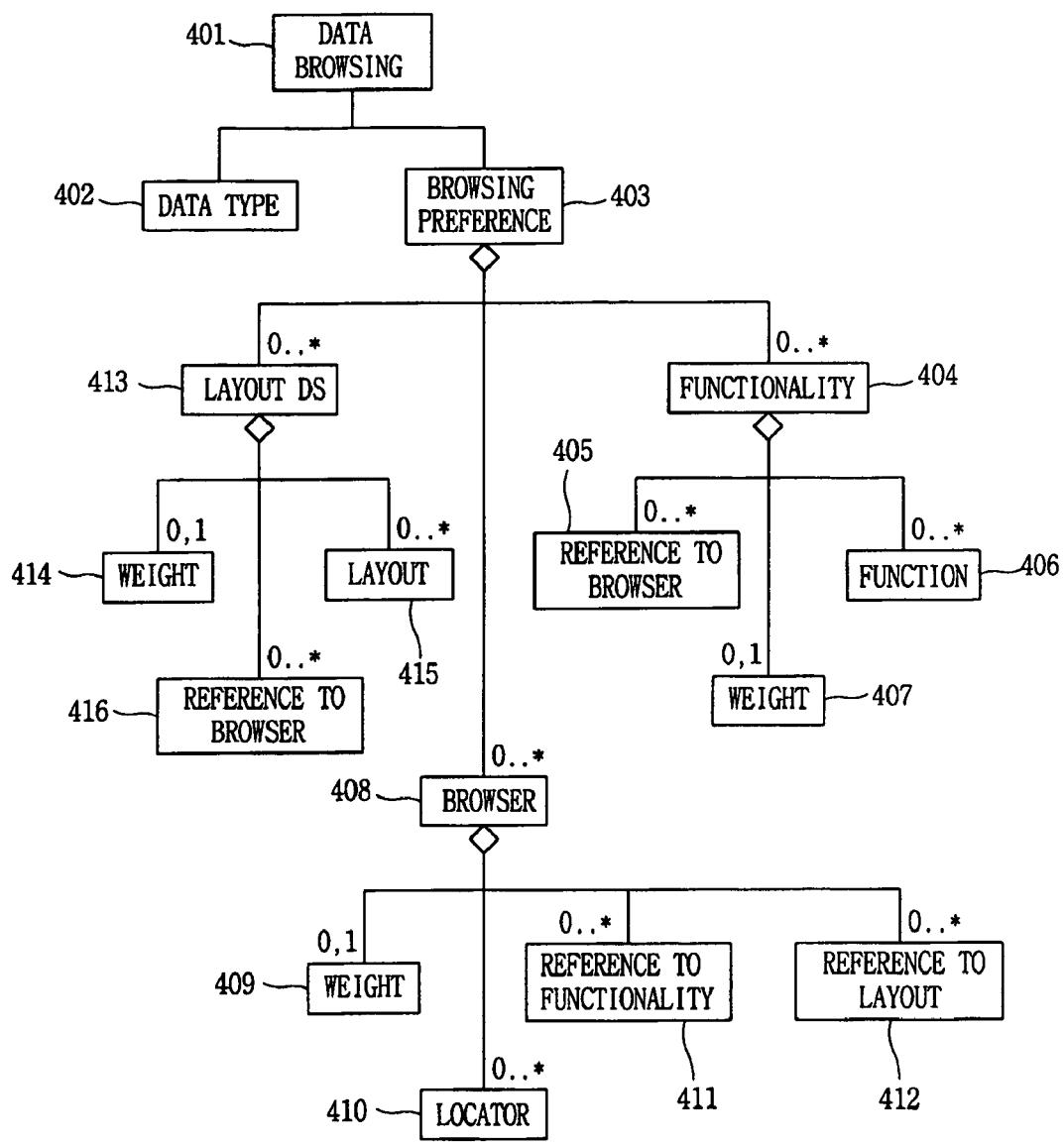
FIG. 4 is a view illustrating a user profile information data structure according to a second embodiment of the present invention.

FIG. 4 is a view illustrating an user profile information data structure for content-based multimedia browsing according to a second embodiment of the present invention, which is formed by further including a layout description scheme of a browser in addition to the structure as described in FIG. 3. In this case, the user can describe preference on a browser according to a certain particular type of multimedia data, but also can describe layout preference DS of the corresponding browser.

As illustrated in FIG. 4, the user profile information data structure has a data browsing DS 401 including a data type DS 402 and a browsing preference DS 403. Such a data browsing DS structure can be given by the type or genre of each multimedia data.

The browsing preference DS 403 corresponds to the data type DS 402.

The browsing preference DS 403 includes a browser DS 408 as an application DS satisfying user preference, a functionality DS 404 for describing a browsing method or browsing criterion, and a layout DS 413 of the browser.

The functionality DS 404 for describing a browsing method or browsing criterion has a reference to browser DS 405 for reference to a corresponding browser, a function DS 406 for selecting a browser, and a weight DS 407 for describing a corresponding weight value.

The application DS 408 has a weight DS 409, locator DS 410, reference to functionality DS 411 for reference to a description scheme for describing a browsing method or standard, and reference to layout DS 412 for layout.

The layout DS 413 has a weight DS 414 for the layout and a reference to browser DS 416 for reference to the browser.

Therefore, by means of the user profile relating to such a user-preferred browsing method (or browsing criterion), it is possible to display a certain particular multimedia data by the user-preferred browsing method or standard in a system of FIGS. 1 and 2. In addition, the layout preference DS of the corresponding browser can be described.

In other words, when an user displays a multimedia data based on the user profile information, a corresponding application (browser) satisfying description schemes 404 through 407 for describing the user-preferred browsing method or standard for the corresponding object, or having been described in the application description schemes 408 through 411 is indexed in the terminal.

At this time, a user-preferred layout of the browser is displayed using the layout DS 413 through 416 and the reference to layout DS 412 in the browser DS.

If the corresponding application exists in the terminal, multimedia data is displayed using the same, or if it does not exist in the terminal, the corresponding application is downloaded using the locator DS 410.

In addition, the number of application (browser) included in the application DS is one or more than one. If the number of application is plural, a user-preferred application is employed using the weight DS 409, which is learned based on user preference for each application.

FIG. 5 is a view illustrating a description scheme of a browsing method or criterion in an user profile information data structure as shown in FIG. 3 or FIG. 4 according to a first embodiment of the present invention.

The structure of FIG. 5 is a function description scheme structure for indexing and displaying a corresponding multimedia data based on character/relation, and includes a basic key item 501 and an order of key item 502.

Figure 6:
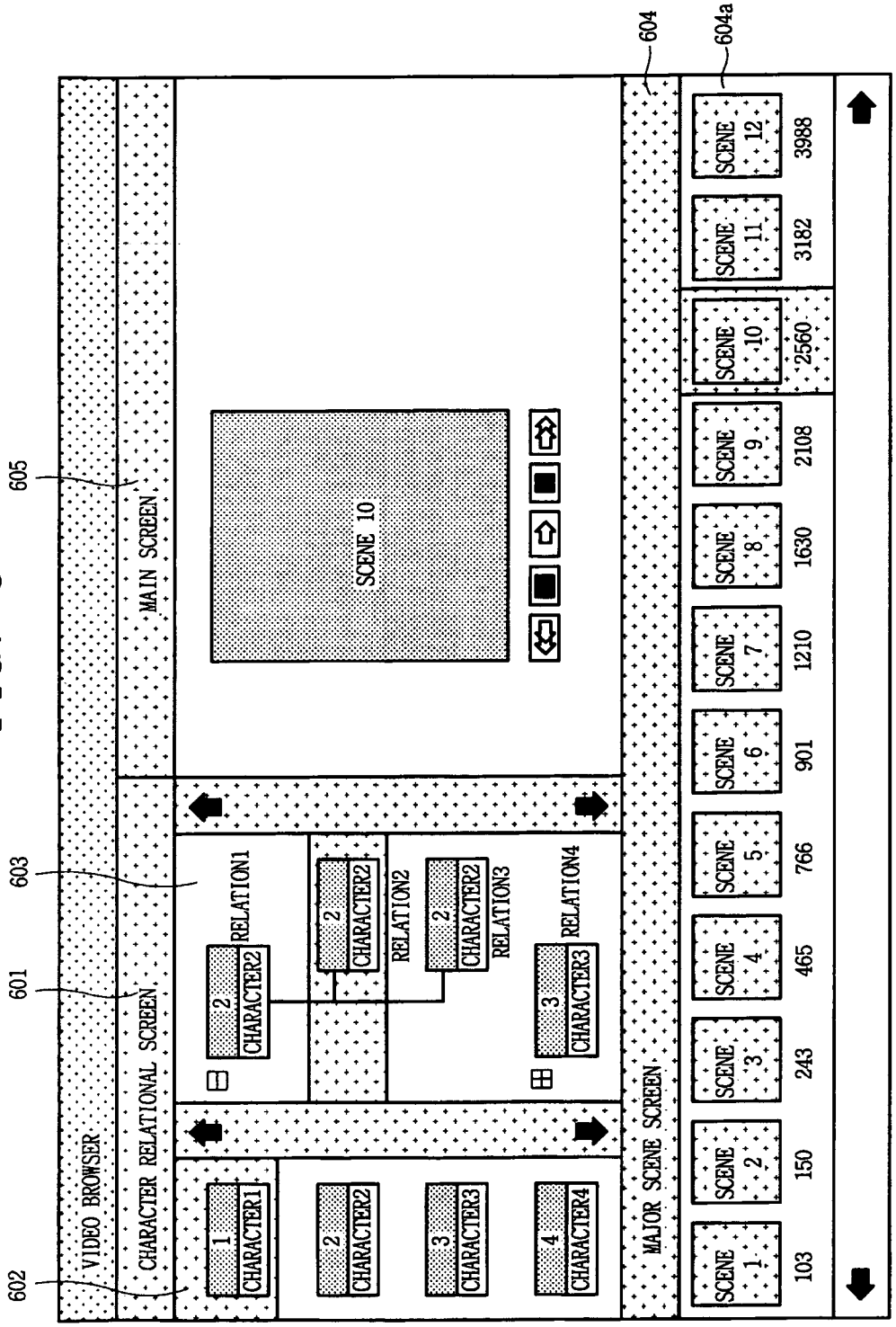
FIG. 6 is a view illustrating an example of a browsing based on user preference.

The basic key item describes browsing on the basis of character and relation 503 and 504. FIG. 6 illustrates an example of a browsing according to such a scheme structure.

As shown in a video browser (user interface) of FIG. 6, a character screen unit 602 of a character relational screen unit 601 displays characters, and a character-relation screen unit 603 displays character-relation satisfying a relation which is selected here.

In addition, a main scene screen unit 604 displays main scenes satisfying the corresponding relation in key frames 604*a*. Here, it is shown that a main screen unit 605 displays a selected particular scene in more detail.

FIG. 7 is a view illustrating a description scheme of a browsing method or criterion in a user profile as shown in FIG. 3 or FIG. 4 according to a second embodiment of the present invention.

The structure of FIG. 7 is a function description scheme structure for displaying a corresponding multimedia data using a 3-level tree in time sequential key frames, and includes a basic key item 701 and an order of key item 702.

The basic key item describes browsing on the basis of key frames, and the order of key item 702 describes time sequential browsing, and describes that the basic key item has a hierarchical structure (depth of key item, level 1=3... ).

Figure 8:
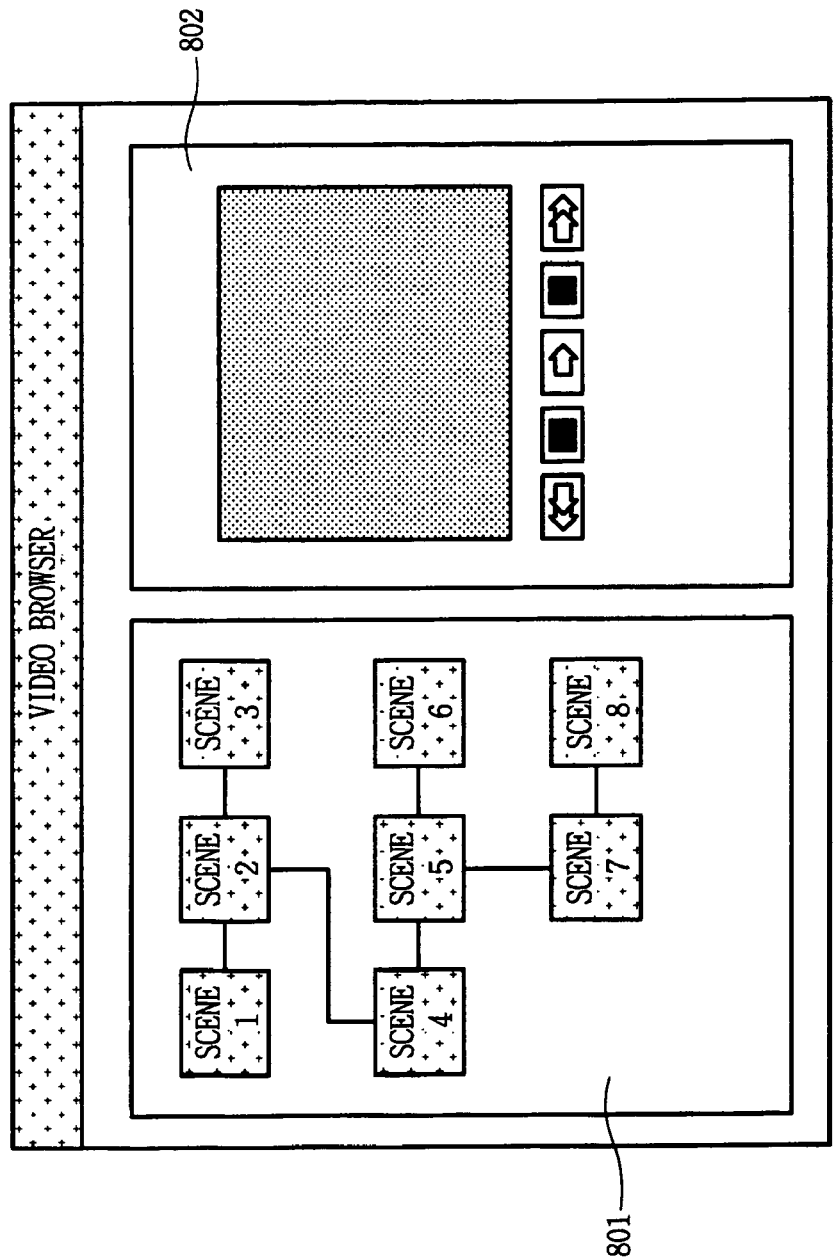
FIG. 8 is a view illustrating another example of a browsing based on user preference.

FIG. 8 is a view illustrating an example of an interface of a browser using the function description scheme structure of FIG. 7.

As shown in a video browser (user interface) of FIG. 8, a key frame unit 601 displays multimedia contents in key frames in a time sequence, and a main screen unit 802 displays a section which is selected here and is represented by key frames.

According to the user profile information data structure and browsing method using the same of the present invention, while implementing content-based moving picture indexing and browsing, an user-preferred browsing method (application) can be provided by each corresponding multimedia data.

Therefore, with respect to a multimedia data selected by the user, the user-preferred browser (application) can display the corresponding multimedia data.

In addition, in the present invention, since the corresponding multimedia data is indexed and browsed by a browser, which is close or identical to the user-preferred browsing method (application), an user-friendly and user-adaptive indexing and browsing environment can be provided when multimedia data is indexed and browsed based on contents.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A method implemented by an apparatus for processing multimedia content and related user preferences, the method comprising:

providing a user preference description describing a plurality of browsing preferences of a multimedia consumer for browsing audio-visual content, the user preference description including a hierarchical data structure in which a first container includes a first set of browsing elements and a genre element specifying that the browsing elements in the first set apply to browsing audio-visual content of a first genre, wherein each browsing element in the first set has a respective weight value that indicates relative importance of the corresponding browsing element for user preferred browsing of the audio-visual content having the first genre, and wherein a first browsing element in the first set describes a preferred content element for browsing the audio-visual content of the first genre, the preferred content element corresponding to one or more events or objects depicted in the audio-visual content of the first genre;

storing the user preference description in a data storage device;

receiving a content description about an audio-visual program having the first genre, the content description describing events and objects depicted in the audio-visual program;

using the respective weight values to select the first browsing element in the first set for processing the received content description; and selecting portions from the audio-visual program for a user-preferred browsing, wherein the selection is based on the preferred content element of the first browsing element and the corresponding events and objects described in the received content description of the audio-visual program.

2. The method of claim 1, wherein providing the user preference description includes receiving user input specifying at least a portion of the plurality of browsing preferences.

3. The method of claim 1, wherein providing the user preference description includes providing at least a portion of the plurality of browsing preferences based on a content usage history of the multimedia consumer.

4. The method of claim 1, further comprising: updating the user preference description.

5. The method of claim 1, wherein the data storage device includes a portable information storing medium, and storing the user preference description includes storing the user preference description in the portable information storing medium.

6. The method of claim 5, wherein the portable information storing medium includes a smart card.

7. The method of claim 1, wherein the preferred content element corresponds to one or more characters, places or scenes depicted in the audio-visual content of the first genre.

8. A method implemented by an apparatus for browsing multimedia content, the method comprising:

receiving a content description about an audio-visual program, the content description describing events and objects depicted in the audio-visual program and identifying a first genre for content in the audio-visual program;

receiving a user preference description describing a plurality of browsing preferences of a multimedia consumer, the user preference description including a hierarchical data structure in which a first container includes a first set of browsing elements and a genre element specifying that the browsing elements in the first set apply to browsing audio-visual content having the first genre, wherein each browsing element in the first set has a respective weight value indicating relative importance of the corresponding browsing element for user preferred browsing of the audio-visual content having the first genre, and wherein a first browsing element in the first set describes a preferred content element for browsing the audio-visual content of the first genre, the preferred content element corresponding to one or more events or objects depicted in the audio-visual content of the first genre; and using the user preference description to apply the user preferred browsing to the content in the audio-visual program, wherein using the user preference description includes selecting the first browsing element from the first set based on the genre element and the respective weight value of each browsing element in the first set, and applying the user preferred browsing includes using the preferred content element of the first browsing element to select the corresponding events and objects from the audio-visual program.

9. The method of claim 8, wherein receiving the user preference description includes receiving the user preference description from a data storage device.

10. The method of claim 9, wherein the data storage device includes a portable information storing medium, and receiving the user preference description includes receiving the user preference description from the portable information storing medium.

11. The method of claim 10, wherein the portable information storing medium includes a smart card.

12. The method of claim 8, further comprising: updating the user preference description.

13. The method of claim 8, wherein the preferred content element corresponds to one or more characters, places or scenes depicted in the audio-visual content of the first genre.

14. A system for processing multimedia content and related user preferences, the system comprising:
   a data storage device; and
   data processing apparatus configured to perform operations comprising:
      providing a user preference description describing a plurality of browsing preferences of a multimedia consumer for browsing audio-visual content, the user preference description including a hierarchical structure in which a first container includes a first set of browsing elements and a genre element specifying that the browsing elements in the first set apply to browsing audio-visual content of a first genre, wherein each browsing element in the first set has a respective weight value that indicates relative importance of the corresponding browsing element for user preferred browsing of the audio-visual content having the first genre, and wherein a first browsing element in the first set describes a preferred content element for browsing the audio-visual content of the first genre, the preferred content element corresponding to one or more events or objects depicted in the audio-visual content of the first genre;
      storing the user preference description in the data storage device;
      receiving a content description about an audio-visual program having the first genre, the content description describing events and objects depicted in the audio-visual program;
      using the respective weight values to select the first browsing element in the first set for processing the received content description; and
      selecting portions from the audio-visual program for a user-preferred browsing, wherein the selection is based on the preferred content element of the first browsing element and the corresponding events and objects described in the received content description of the audio-visual program.

15. The system of claim 14, wherein providing the user preference description includes receiving user input specifying at least a portion of the plurality of browsing preferences.

16. The system of claim 14, wherein providing the user preference description includes providing at least a portion of the plurality of browsing preferences based on a content usage history of the multimedia consumer.

17. The system of claim 14, wherein the data processing apparatus is further configured to perform operations comprising:
   updating the user preference description.

18. The system of claim 14, wherein the data storage device includes a portable information storing medium, and wherein storing the user preference description includes storing the user preference description in the portable information storing medium.

19. The system of claim 18, wherein the portable information storing medium includes a smart card.

20. The system of claim 14, wherein the preferred content element corresponds to one or more characters, places or scenes depicted in the audio-visual content of the first genre.

21. A system for browsing multimedia content, the system comprising:
   a data storage device to store a user preference description describing a plurality of browsing preferences of a multimedia consumer, the user preference description including a hierarchical data structure in which a first container includes a first set of browsing elements and a genre element specifying that the browsing elements in the first set apply to browsing audio-visual content having a first genre, wherein each browsing element in the first set has a respective weight value indicating relative importance of the corresponding browsing element for user preferred browsing of the audio-visual content having the first genre, and wherein a first browsing element in the first set describes a preferred content element for browsing the audio-visual content of the first genre, the preferred content element corresponding to one or more events or objects depicted in the audio-visual content of the first genre; and
   data processing apparatus configured to perform operations comprising:
      receiving a content description about an audio-visual program, the content description describing events and objects depicted in the audio-visual program and identifying the first genre for content in the audio-visual program;
      receiving the user preference description; and
      using the user preference description to apply the user preferred browsing to the content in the audio-visual program, wherein using the user preference description includes selecting the first browsing element from the first set based on the genre element and the respective weight value of each browsing element in the first set, and applying the user preferred browsing includes using the preferred content element of the first browsing element to select the corresponding events and objects from the audio-visual program.

22. The system of claim 21, wherein the data storage device includes a portable information storing medium, and the user preference description is stored in the portable information storing medium.

23. The system of claim 22, wherein the portable information storing medium includes a smart card.

24. The system of claim 21, wherein the data processing apparatus is further configured to perform operations comprising:
   updating the user preference description stored in the data storage device.

25. The system of claim 21, further comprising:
   a display device to display content from the audio-visual program.

26. The system of claim 21, wherein the preferred content element corresponds to one or more characters, places or scenes depicted in the audio-visual content of the first genre.

27. A computer program product, tangibly embodied in a machine readable medium, for processing user preferences, the computer program comprising instructions to cause data processing apparatus to perform operations comprising:

providing a user preference description describing a plurality of browsing preferences of a multimedia consumer for browsing audio-visual content, the user preference description including a hierarchical data structure in which a first container includes a first set of browsing elements and a genre element specifying that the browsing elements in the first set apply to browsing audio-visual content of a first genre, wherein each browsing element in the first set has a respective weight value that indicates relative importance of the corresponding browsing element for user preferred browsing of the audio-visual content having the first genre, and wherein a first browsing element in the first set describes a preferred content element for browsing the audio-visual content of the first genre, the preferred content element corresponding to one or more events or objects depicted in the audio-visual content of the first genre;

storing the user preference description in a data storage device;

receiving a content description about an audio-visual program having the first genre, the content description describing events and objects depicted in the audio-visual program;

using the respective weight values to select the first browsing element in the first set for processing the received content description; and selecting portions from the audio-visual program for a user-preferred browsing, wherein the selection is based on the preferred content element of the first browsing element and the corresponding events and objects described in the received content description of the audio-visual program.

28. The computer program product of claim 27, wherein providing the user preference description includes receiving user input specifying at least a portion of the plurality of browsing preferences.

29. The computer program product of claim 27, wherein providing the user preference description includes providing at least a portion of the plurality of browsing preferences based on a content usage history of the multimedia consumer.

30. The computer program product of claim 27, the computer program further comprising instructions to cause data processing apparatus to perform operations comprising:

updating the user preference description.

31. The computer program product of claim 27, wherein the data storage device includes a portable information storing medium, and storing the user preference description includes storing the user preference description in the portable information storing medium.

32. The computer program product of claim 27, wherein the portable information storing medium includes a smart card.

33. A computer program product, tangibly embodied in machine readable medium, for browsing multimedia content, the computer program comprising instructions to cause data processing apparatus to perform operations comprising:

receiving a content description about an audio-visual program, the content description describing events and objects depicted in the audio-visual program and identifying a first genre for content in the audio-visual program;

receiving a user preference description describing a plurality of browsing preferences of a multimedia consumer, the user preference description including a hierarchical data structure in which a first container includes a first set of browsing elements and a genre element specifying that the browsing elements in the first set apply to browsing audio-visual content having the first genre, wherein each browsing element in the first set has a respective weight value indicating relative importance of the corresponding browsing element for user preferred browsing of the audio-visual content having the first genre, and wherein a first browsing element in the first set describes a preferred content element for browsing the audio-visual content of the first genre, the preferred content element corresponding to one or more events or objects depicted in the audio-visual content of the first genre; and using the user preference description to apply the user preferred browsing to the content in the audio-visual program, wherein using the user preference description includes selecting the first browsing element from the first set based on the genre element and the respective weight value of each browsing element in the first set, and applying the user preferred browsing includes using the preferred content element of the first browsing element to select the corresponding events and objects from the audio-visual program.

34. The computer program product of claim 33, wherein receiving the user preference description includes receiving the user preference description from a data storage device that includes a portable information storing medium.

35. The computer program product of claim 33, the computer program further comprising instructions to cause data processing apparatus to perform operations comprising:

updating the user preference description.

* * * * *